United States Patent [19]
Peil

[11] Patent Number: 5,518,351
[45] Date of Patent: May 21, 1996

[54] SELF-TAPPING SCREW HAVING THREADED NUT AS A HEAD

[76] Inventor: Eugene D. Peil, 5983 Ridge Creek Rd., St. Paul, Minn. 55126

[21] Appl. No.: 287,483

[22] Filed: Aug. 8, 1994

Related U.S. Application Data

[63] Continuation-in-part of Ser. No. 32,527, Mar. 15, 1993, abandoned, which is a continuation-in-part of Ser. No. 793,158, Nov. 18, 1991, abandoned.

[51] Int. Cl.$^6$ ..................................................... F16B 35/02
[52] U.S. Cl. ........................ 411/383; 411/387; 411/396; 411/375; 248/59; 248/62
[58] Field of Search ............................. 411/82, 176, 182, 411/183, 201, 276, 375, 383, 386–389, 396, 397, 400–403, 531, 533, 542, 543, 925, 955; 248/58, 59, 62, 74.1, 317, 318, 331, 342, 343

[56] References Cited

U.S. PATENT DOCUMENTS

| | | | |
|---|---|---|---|
| 316,922 | 4/1885 | Trask | 248/59 |
| 476,227 | 5/1892 | Dunning | 248/59 |
| 631,887 | 8/1899 | Clark | 248/59 |
| 705,971 | 7/1902 | Smart | 248/59 |
| 4,306,696 | 12/1981 | Pondman | 248/62 X |
| 4,460,300 | 7/1984 | Bettini et al. | 411/375 |
| 4,488,695 | 12/1984 | Ruuble | 248/62 |
| 4,764,069 | 8/1988 | Reinwall et al. | 411/397 |
| 4,881,861 | 11/1989 | Hewison | 411/387 X |
| 4,911,592 | 3/1990 | Muller | 411/183 X |
| 4,934,634 | 6/1990 | Breeden, Jr. et al. | 248/59 |
| 4,944,644 | 7/1990 | Bell | 411/375 X |
| 4,958,796 | 9/1990 | Bernosky | 411/383 X |
| 5,009,386 | 4/1991 | Berger et al. | 248/62 X |
| 5,054,982 | 10/1991 | Freeman | 411/383 X |
| 5,295,647 | 3/1994 | Weidler | 248/62 |

FOREIGN PATENT DOCUMENTS 1341908  12/1973  United Kingdom .................. 411/383

OTHER PUBLICATIONS

Elco Industries, Inc., Hanger Mate–Threaded Rod Anchor, Advertisement.

*Primary Examiner*—Steven N. Meyers
*Assistant Examiner*—Suzanne L. Dino
*Attorney, Agent, or Firm*—Haugen and Nikolai

[57] ABSTRACT

An article of manufacture consisting of a self-tapping screw with a hex nut, joined to the head thereof where the hex nut including an internally threaded central bore, is used to facilitate the suspension of water pipes from a ceiling member in a building. The article can be inserted into the ceiling surface by first inserting the hex head into a socket which is affixed to the chuck of an electric drill. When the drill is energized, the self-tapping screw drills into or through the ceiling surface. Now, when the article is pulled free from the drill-mounted wrench socket, a threaded rod may be screwed into the hex nut for suspending a pipe cradle.

6 Claims, 3 Drawing Sheets

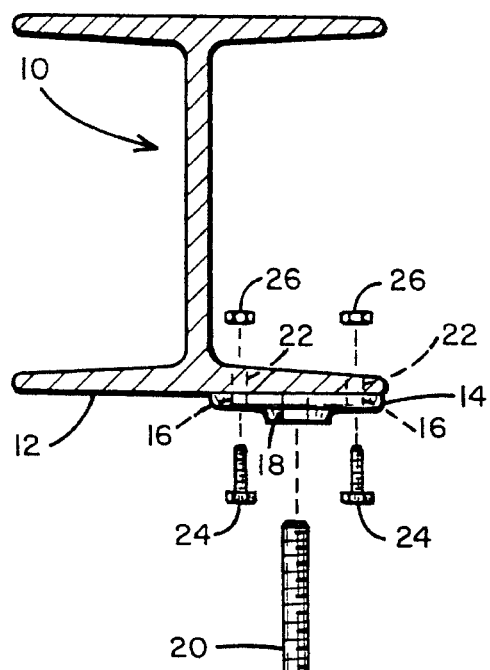
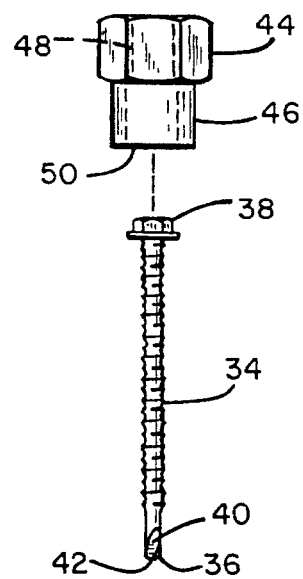
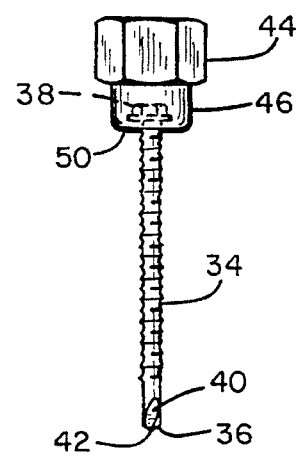
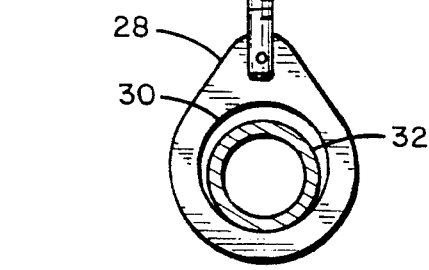
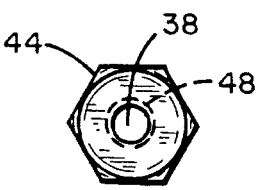
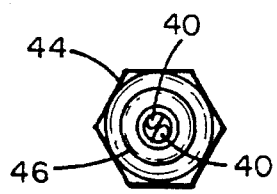
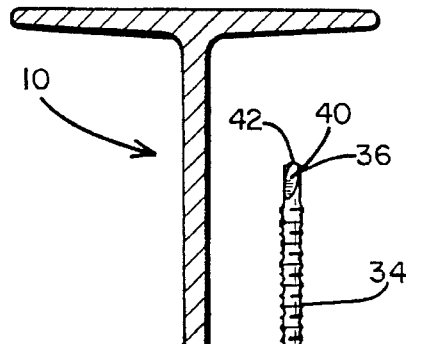
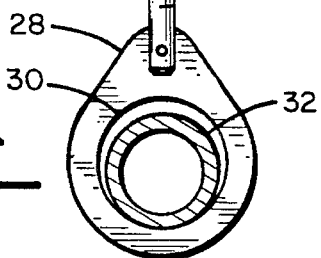

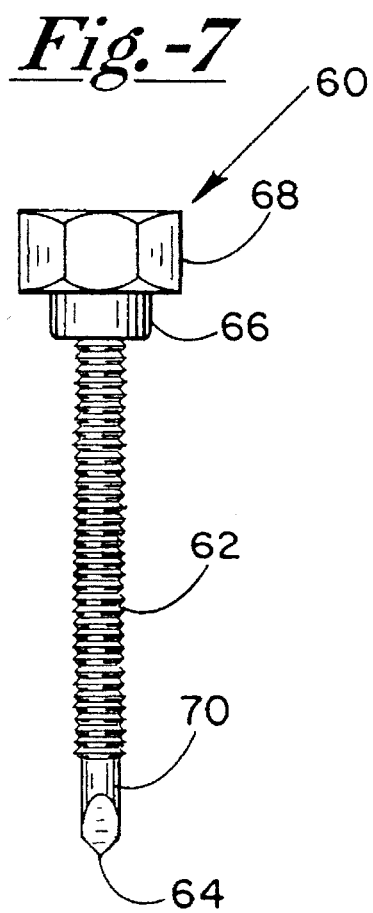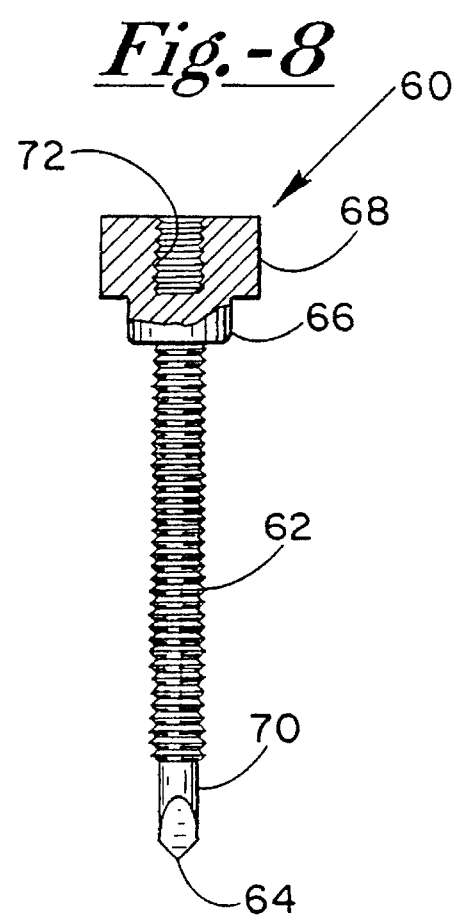

SELF-TAPPING SCREW HAVING THREADED NUT AS A HEAD

This is a continuation-in-part application of application Ser. No. 08/032,527, filed Mar. 15, 1993, entitled "SELF-TAPPING SCREW HAVING THREADED NUT AS A HEAD", now abandoned in favor of this application, which, in turn, is a continuation-in-part application of application Ser. No. 07/793,158, filed Nov. 18, 1991, now abandoned.

BACKGROUND OF THE INVENTION

1. Field of the Invention

This invention relates generally to a special-purpose hardware item, and more particularly to a self-tapping screw assembly especially designed to facilitate the mounting of automatic sprinkling systems or other structures to ceiling members.

II. Discussion of the Prior Art

Various devices are known in the art for facilitating the mounting of water pipes, electrical conduits, unit heaters and the like, to ceiling members in a building. For example, when installing automatic sprinkler systems, it is necessary to secure water pipes which feed the sprinkler heads securely to the ceiling in a way that the hanger members can readily withstand the weight of the pipes when filled with water. One prior art attachment device is shown in U.S. Pat. No. 4,934,634 and includes a flange plate E having two or more screw holes extending through its thickness dimension and an internally threaded socket. To install this prior art hanger, it is necessary to first use the flange as a template to mark the hole locations and then drill holes so that mounting screws may be inserted through the flange plate and tightened into the drilled holes to thereby secure the flange to the ceiling beam or similar surface. Once that device is installed, a threaded rod C having a pipe cradle or loop A affixed thereto is threaded into the threaded socket of the flange plate. With the hangers are appropriately positioned on the ceiling, the water pipe D may be inserted into the cradles and, subsequently, the sprinkler heads appropriately located along the lengths of the pipes within the area to be protected, thus completing the sprinkler system installation.

It should be apparent to those skilled in the art from the above explanation of the prior art that it is not only labor-intensive, but the hardware employed tends to be quite expensive. Accordingly, a need has existed for many years for a simpler, less expensive way of suspending pipe hangers and other supports from a ceiling surface. It is a principal object of the present invention to provide a solution meeting that long-felt need.

SUMMARY OF THE INVENTION

The present invention is an article of manufacture comprising a self-tapping screw having a hex head nut swaged or otherwise press-fit onto the head of the screw. The hex head nut includes a threaded bore. To install the device into a ceiling beam or rafter, the user need only insert the hex head of the self-tapping screw into a correspondingly sized socket fitted into the chuck of a power drill. Then, by holding the self-drilling, self-tapping screw against the beam where it is desired to hang a pipe stringer and by then pulling the trigger on the power drill, the screw is advanced into the beam or rafter to the point where the base of the hex nut on the head of the screw abuts the rafter. At this point, the threaded rod on the pipe cradle can be readily threaded into the threaded bore of the hex head nut. It is found that the holding force provided by this mode of attachment far exceeds the expected load when the hanger assemblies are appropriately spaced along the length of the pipe runs. The device of the present invention may find alternative uses as well, such as in suspending electrical and/or heating fixtures.

DESCRIPTION OF THE DRAWINGS

The foregoing features and advantages of the invention will become apparent to those skilled in the art from the following detailed description of the preferred embodiment, especially when considered in conjunction with the accompanying drawings in which like numerals in the several views refer to corresponding parts.

FIG. 1 is a drawing illustrating a prior art system for securing water pipes to a ceiling member;

FIG. 2 is a side elevation showing the individual piece parts comprising the screw-type anchor of the present invention;

FIG. 3 is a side elevation of the screw-type anchor of FIG. 2 with the individual parts joined;

FIG. 4 is a top view of the assembly of FIG. 3;

FIG. 5 is a bottom view of the embodiment of assembly of FIG. 3;

FIG. 6 is a view showing the manner in which the present invention is used to suspend a water pipe from a ceiling structure;

FIG. 7 is a side elevational view of an alternative preferred embodiment of the invention illustrating a screw-type anchor comprised of a unitary member formed using extrusion techniques; and FIG. 8 is a sectional view 8—8 shown in FIG. 7 illustrating the single piece anchor with a tapped central bore.

DESCRIPTION OF THE PREFERRED EMBODIMENT

Figure 9:
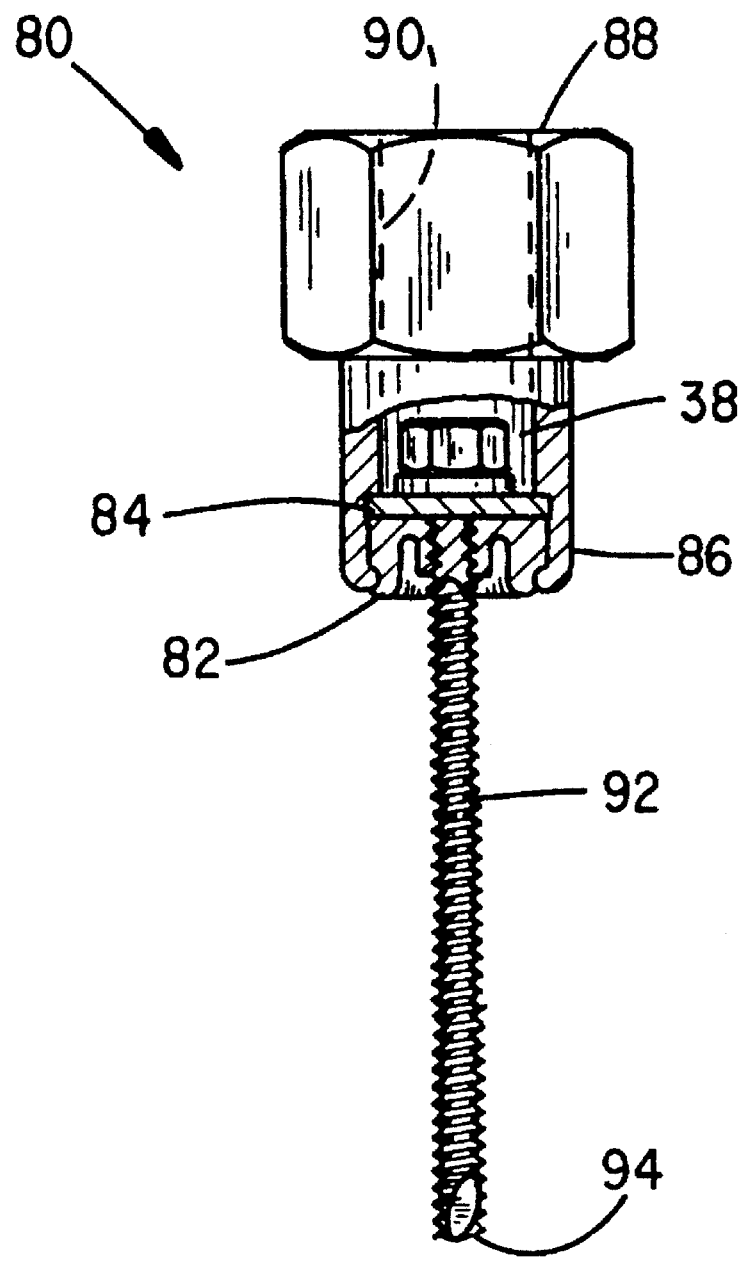
FIG. 9 is a partially sectioned side view of an alternative preferred embodiment of the invention illustrating a screw-type anchor having an integral seal member captured by, and extruding from, a swaged hex nut member.

So that the reader can better appreciate the present invention, attention is first directed to FIG. 1 which illustrates one prior art approach for suspending a water pipe from a ceiling structure. In FIG. 1, numeral 10 indicates an I-beam and secured to the undersurface 12 thereof is a flange plate 14 having a plurality of holes, as at 16, drilled therethrough and a central aperture 18 which is threaded so as to receive a correspondingly threaded rod 20 therein. The flange 14 is affixed to the undersurface 12 of the I-beam by first drilling holes through the I-beam, as at 22, and then fitting bolts 24 through the aligned holes 16 and 22 and ultimately holding them in place with nuts 26.

Suspended from the lower end of the threaded rod 20 is a pipe cradle 28 in the form of a plate having an aperture 30 formed therethrough whose diameter is sufficiently large to allow a water pipe 32 to be slipped therethrough. The flange 14 is first mounted to the ceiling beam 10 and then the threaded rod 20 with its cradle 28 is screwed into the threaded aperture 18 in the flange 14. Following that, the pipe 32 is inserted through the aperture 30 in the plate 28.

It is apparent from the above description of the prior art arrangement that several steps are required to suspend the pipe from the ceiling member. First, the flange 14 must be held at its desired location against the undersurface of the ceiling structure 12 and the locations of the holes 16 must be marked. Next, the holes 22 must be drilled through the I-beam so that the screws 24 may be inserted. The screws 24 are then held in place by assembling the nuts 26 to the ends of the screws projecting through the aligned holes 16–22 and tightened down. Next, the threaded rod with its cradle 28 must be screwed into the threaded bore 18 of the flange 14.

The present invention provides an alternative way of suspending the rod 20 and the cradle 28 from a ceiling structure, such as a I-beam, a wooden rafter or, for that matter, a reinforced concrete surface. In particular, the present invention provides an anchor comprising a tempered, self-drilling, self-tapping screw 34 having a drill point 36 on one end thereof and a polygonal-shaped head 38 on its other end. The drill point 36 includes helically oriented flutes 40 ground into the tip and terminating in a point 42. The suspension device of the present invention also includes a hex nut 44 which is integrally formed with a cylindrical collar 46 and a central bore 48 is formed through the hex nut 44 and the cylindrical collar 46 allowing the head 38 of the self-tapping screw 34 to be inserted into the bore 48.

Once the screw head 38 is seated within the collar 46, the assembly is subjected to a swaging operation in which a forming tool engages the lower edge 50 of the collar 46 and rolls the metal over as illustrated in FIGS. 3 and 5 of the drawings. Thus, the hex nut 44 is tightly and permanently joined to the head 38 of the self-tapping screw 34. As seen in FIG. 4, the bore 48 formed in the hex nut 44 is threaded with a standard thread corresponding to the external threads formed on the rod 20.

FIGS. 2 and 3 of the drawings show the screw member 34 being inserted into the collar 46 from the bottom thereof and, following that, the collar is swaged to positively hold the nut 44 onto the head 38 of the screw. It is also contemplated that the screw can have a tapered head, much like that on a conventional wood screw and that the nut 44 may have a correspondingly tapered bore formed proximate the junction between the hex nut portion and the collar. By dropping the screw with the tapered head through the threaded bore and then pressure-welding the parts together, the nut 44 and screw 34 are permanently joined to one another in a way that will not readily permit the screw 34 to become separated from the nut 44 when used to anchor a heavy item from a ceiling structure.

In use, and with reference to FIG. 6, the anchor of the present invention can be inserted into a conventional wrench socket of a size to accommodate hex nut 44 and that socket being mounted into the chuck of an electric drill with the threaded screw portion 34 extending outwardly. By bringing the sharpened point 42 against the undersurface 12 of the I-beam 10 and turning on the power to the hand drill, the drill point 36 of the self-tapping screw 34 will drill through the I-beam and will advance until the rolled surface 50 of the collar 46 abuts the undersurface 12. The hex nut 44 can now be pulled free of the socket on the electric drill and the operator can screw the threaded rod 20 into the threaded bore 48 of the hex nut to suspend the pipe cradle 28 allowing a pipe as at 32 to be inserted and suspended.

With no limitation intended and strictly for the purpose of example, the hex nut 44 may be a standard ⅝" nut formed from leaded screw machine stock and the collar 46, prior to forming, may be 0.40". The bore 48 formed in the hex nut may have 3/8–16 threads and the nut is joined to a self-tapping screw having an approximately 5/16" diameter and a drill tip. Such a device has a tensile strength in excess of 5,000 lbs. before the screw portion separates. Pull tests have indicated that the anchor of the present invention is capable of supporting a load of over 1,500 lbs. when screwed into a wood beam, which is more than adequate to support an overhead sprinkling system where the anchor assemblies are placed at intervals of 15 ft. or less.

Now referring to FIG. 7, an alternative embodiment of the screw-type anchor of FIG. 2 is shown generally at 60. Anchor 60 is similar to the anchor shown in FIG. 2 except that anchor 60 is comprised of a one-piece unitary member formed using well-known extrusion techniques. When manufactured, the extruder forms a self-tapping threaded portion 62 having a drill point 64 on one end thereof, the threaded portion 62 extending to a cylindrical collar 66 and a hex nut 68 at the opposite end. Drill point 64 includes helically oriented flutes 70 to provide a self-tapping anchor which can be driven into an I-beam comprised of either wood or steel. Hex nut 68 has a tapped bore 72 formed therein, preferably comprised of ⅜-16 threads, for receiving the threaded rod 20, shown in FIG. 6.

A key feature of the alternative preferred embodiment shown in FIG. 7 and 8 is that it can be easily manufactured using well-known extrusion techniques, and further, that hex nut 68 is an integral portion of threaded portion 62, and can be mounted into the chuck of an electric drill and subjected to a high torque for driving anchor 60 into rigid I-beams comprised of steel. Because collar 66 has a diameter less than hex nut 68, both hex nut 68 and collar 66 can be received within the chuck of the drill for easy installation.

Now referring to FIG. 9, yet another alternative embodiment of the screw-type anchor of FIG. 2 is generally shown at 80. Anchor 80 is similar to the anchor shown in FIG. 2, and includes a secured resilient seal member 82. Seal member 82 is comprised of a flexible, and preferably rubber, annular washer. Interposed between stud head 38 and seal member 82 is a steel washer 84. An upper portion of seal member 82 and washer 84 are encompassed by and secured within a lower swaged portion 86 of a hex nut 88. A tapped counter bore shown in phantom at 90 is identical to the threaded counter bore 38 shown in FIG. 2.

During manufacturing, a threaded stud portion 92 of anchor 80 is first inserted into a female die (not shown), the seal member 82 and washer 84 already being in place around stud 92 proximate hex nut 88. Using conventional manufacturing techniques, member 86 is swaged about seal member 82 and washer 84. This swaging operation, in turn, causes seal member 82 to extrude from within swaged member 86 and become deformed, as shown in FIG. 9. In addition, a lip is formed at the distal end of swaged member 86 which captures seal member 82 therewithin. Thus, seal member 82 becomes integral to and secured within swaged member 86, and cannot slide along threaded stud 92.

In use, hex head 88 is received into a drill chuck and driven into an I-beam as previously discussed with regards to the other embodiments. When swaged member 86 is finally advanced to abut the I-beam or ceiling member that it is ultimately driven into, seal member 82 will provide a liquid impermeable seal between this I-beam and swaged member 86. Since seal member 82 is integral to and captured by swaged member 86, the installer does not need to pay particular attention of the seal member. Rather, the installer can simply insert hex head 88 into the drill chuck, and drive anchor 80 into the I-beam in a simple, one-Step operation. Steel washer 84 provides a uniform surface to help constrain seal member 82 within swaged member 86. During manufacturing, seal member 82 prevents washer 84 from sliding down stud 92 when anchor 80 is inserted tip first into the female die. Threaded stud 92 includes a helical oriented flute 94 so that anchor 80 is self-tapping and can be driven into an I-beam, as previously discussed.

This invention has been described herein in considerable detail in order to comply with the Patent Statutes and to provide those skilled in the art with the information needed to apply the novel principles and to construct and use such specialized components as are required. However, it is to be understood that the device details and uses therefor can be made without departing from the scope of the invention itself.

What is claimed is:

1. An apparatus for affixing to a ceiling of a building to facilitate the suspension of a load, comprising, in combination:

a mounting device having an elongated, externally threaded stud with an enlarged head on one end and a helically fluted drill point on the other end;

a hex nut having an internally threaded bore in an integrally formed cylindrical collar extending from one side of said nut concentric with said threaded bore, said nut being swaged about and rigidly secured to said enlarged head on said stud to rigidly join said nut to said threaded stud such that rotation of said hex nut correspondingly rotates said mounting device; and a pipe hanger having a cradle portion on one end and a threaded portion at the other end which is threadably receivable into said internally threaded bore of said hex nut.

2. The apparatus as in claim 1 wherein said external threads on said stud form a self-tapping screw.

3. The apparatus as in claim 2 wherein said stud is formed from tempered steel.

4. The apparatus as specified in claim 1 wherein said enlarged head of said mounting device comprises a polygonal-shaped head.

5. An apparatus for affixing to a ceiling of a building to facilitate the suspension of a load, comprising in combination:

a mounting device having an elongated externally threaded stud with a hex nut defined on a first end and a helical fluted drill point on the other end, said hex nut having an internally threaded bore axially aligned With said stud and disposed opposite thereof, said mounting device including a seal member securingly disposed about said stud adjacent to said hex nut, said mounting device further including an enlarged head at said first end with said hex nut being swaged about and rigidly secured to said enlarged head, wherein said swaged hex nut is also swaged about a portion of said seal member to capture said seal member; and a pipe hanger having a cradle portion on one end and a threaded portion at the other end which is threadably receivable into said internally threaded bore of said hex nut.

6. The apparatus as specified in claim 5 wherein said seal member is partially extruded from said swaged hex nut.

* * * * *